UNITED STATES PATENT OFFICE 2,060,254.

PROCESS OF MAKING SULPHURIC ACID ESTERS OF ALIPHATIC ALCOHOLS AND THE PRODUCTS

Hugo Siebenbürger, Basel, Switzerland, assignor to the firm of Society of Chemical Industry in Basle, Basel, Switzerland No Drawing. Application May 20, 1932, Serial No. 612,652. In Switzerland May 29, 1931

13 Claims. (Cl. 260—99.12)

This invention relates to the manufacture of particularly pure sulphuric acid esters of aliphatic alcohols which are valuable assistants in the industry of improving textile materials and also valuable as intermediates for other products. It comprises the process of making these esters, as well as the esters themselves.

It has been found that the sulphuric acid esters of monovalent aliphatic alcohols of high molecular weight containing at least 9 carbon atoms can be obtained in a very simple manner and without secondary reaction by treating these alcohols with the addition product of sulfur trioxide and a liquid organic base, in the presence of an excess of the organic base. The invention permits for example the production of sulphuric acid esters of alcohols, such as 2:6-dimethyl-hepten(2)ol(6)

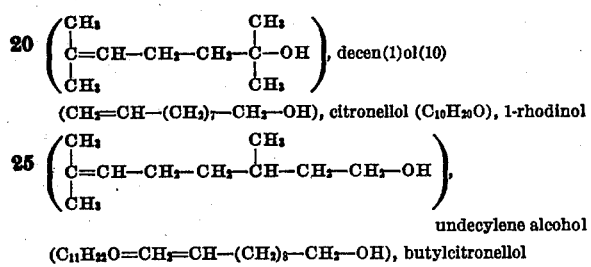

($CH_2=CH-(CH_2)_7-CH_2-OH$), citronellol ($C_{10}H_{20}O$), 1-rhodinol undecylene alcohol
($C_{11}H_{22}O=CH_2=CH-(CH_2)_8-CH_2-OH$), butylcitronellol ($C_{14}H_{28}O$), phytol ($C_{20}H_{40}O$), erucyl alcohol ($C_{22}H_{44}O$), lauryl alcohol myristyl alcohol, cetyl alcohol, stearin alcohol, olein alcohol, the fatty alcohols of wax and wool, by a very smooth reaction and, in contrast to the hitherto known methods of preparing sulphuric acid esters of these alcohols, in a condition free from other sulfonation products, such as are formed by replacement of a hydrogen atom by a SO₃H group or by addition of a sulphuric acid residue at an unsaturated linkage which just in the case of unsaturated alcohols has not been possible hitherto.

Besides the parent materials hereinbefore named there may also be used mixtures of these alcohols or products which are obtained for example by catalytic reduction of mixtures of fatty acids or by any other synthetic method.

As liquid bases which come into consideration there may be mentioned pyridine, quinolines, dimethylaniline, picoline, trimethylamine, triethylamine, betaine, etc. In many cases the esterification succeeds also if the tertiary amine is replaced wholly or in part by a suitable primary or secondary amine, preferably an aromatic amine.

The pure sulphuric acid esters obtained in accordance with the invention may be used as parent materials for further reactions or they may be used as auxiliary agents in the textile industry. In the latter case they are very valuable, in an acid as well as in a neutral or alkaline medium, as wetting agents, as cleansing and emulsifying agents and as additions to carbonizing baths or to various finishes.

The following examples illustrate the invention, the parts being by weight:—

Example 1

Into 100 parts of anhydrous pyridine 30 parts of chlorosulfonic acid (120-125 per cent. of the theoretical) are allowed to drop at 0-10° C. whilst stirring. A solution consisting of 54 parts of olein alcohol and 170 parts of anhydrous pyridine is then added to the suspension of pyridine-sulfur trioxide thus obtained. In this operation the temperature rises to about 30° C. The whole is further heated to 40° C. and maintained for 2 hours at 40-45° C., after which it is cooled and neutralized with a dilute solution of sodium hydroxide until it is just alkaline towards phenol phthalein. The pyridine and the water are then expelled by distillation under reduced pressure at a moderate temperature (50-60° C.), and the dry, yellowish-white residue is thoroughly extracted with absolute alcohol. By concentrating the alcoholic solution to a small volume the sodium salt of olein sulphuric acid ester separates in a pure state which, when dry, constitutes a yellowish-white powder which dissolves in water to an absolutely clear solution. The ester salt is obtained in a yield exceeding 90 per cent. of the theoretical.

From analytical determinations it is found that the product consists only of the sulphuric acid ester salt.

If in the above example double the quantity of chlorosulfonic acid is employed there is nevertheless obtained only the sodium salt of olein monosulphuric acid ester. By this manner of working the double linkage remains unaffected.

The other alcohols hereinbefore named may be esterified in a manner analogous to that described in this example.

Example 2

30 parts of chlorosulfonic acid are added drop by drop at 0-10° C. to a mixture consisting of 180 parts of chlorobenzene and 90 parts of dimethylaniline and there is allowed to run slowly into this sulphonating mixture, containing dimethyl-aniline-sulphur trioxide, a solution of 68 parts of stearin alcohol in 180 parts of chlorobenzene. Esterification proceeds with a moderate rise in temperature. The reaction mixture is heated to 40° C. and maintained for a further 2 hours at 40–45° C. After cooling, the reaction mixture is neutralized cold with a dilute solution of sodium hydroxide and completely freed first from chlorobenzene by distillation under reduced pressure and then from dimethyl-aniline by distillation with steam. The aqueous liquid is then evaporated to dryness under reduced pressure and the residue is stirred with a small quantity of water whereby the greater part of the inorganic salts passes into solution; the whole is filtered, the residue is washed with cold water and again dried under reduced pressure. The sodium salt of the sulphuric acid ester of stearin alcohol is thus obtained in practically quantitative yield in the form of a sparingly soluble pure white powder. In this case also it can be verified analytically that only the sulphuric acid ester is formed by the process.

Instead of stearin alcohol, wax alcohol can be esterified in an analogous manner.

What I claim is:—

1. A manufacture of sulphuric acid esters of such aliphatic alcohols which contain at least 9 carbon atoms and only one hydroxy group, consisting in reacting with the addition product of sulphur trioxide and a liquid organic base, in the presence of an excess of the organic base, an aliphatic alcohol containing at least 9 carbon atoms and only one hydroxy group.

2. A manufacture of sulphuric acid esters of such aliphatic alcohols which contain at least 9 carbon atoms and only one terminal hydroxy group, consisting in reacting with the addition product of sulphur trioxide and a liquid organic base, in the presence of an excess of the organic base, an aliphatic alcohol containing at least 9 carbon atoms and only one hydroxy group.

3. A manufacture of sulphuric acid esters of such normal aliphatic alcohols which contain at least 9 carbon atoms and only one terminal hydroxy group, consisting in reacting with the addition product of sulphur trioxide and a liquid tertiary organic base, in the presence of an excess of the organic base, a normal aliphatic alcohol containing at least 9 carbon atoms and only one hydroxy group.

4. A manufacture of sulphuric acid esters of such normal unsaturated aliphatic alcohols which contain at least 9 carbon atoms and only one terminal hydroxy group, consisting in reacting with the addition product of sulphur trioxide and a liquid tertiary organic base, in the presence of an excess of the organic base, a normal unsaturated aliphatic alcohol containing at least 9 carbon atoms and only one hydroxy group.

5. A manufacture of sulphuric acid esters of such normal unsaturated aliphatic alcohols which contain from 17 to 22 carbon atoms and only one terminal hydroxy group, consisting in reacting with the addition product of sulphur trioxide and a liquid tertiary organic base, in the presence of an excess of the organic base, a normal unsaturated aliphatic alcohol containing from 17 to 22 carbon atoms and only one hydroxy group.

6. A manufacture of sulphuric acid esters of such normal unsaturated aliphatic alcohols which contain from 17 to 22 carbon atoms and only one terminal hydroxy group, consisting in reacting with the addition product of sulphur trioxide and pyridine, in the presence of an excess of the organic base, a normal unsaturated aliphatic alcohol containing from 17 to 22 carbon atoms and only one hydroxy group.

7. A manufacture of a sulphuric acid ester of olein alcohol, consisting in reacting olein alcohol with the addition product of sulphur trioxide and pyridine, in the presence of an excess of pyridine.

8. The sulphuric acid esters of monovalent unsaturated aliphatic alcohols containing at least 9 carbon atoms in a condition free from other sulfate and sulphonic acid groups, the sodium salts of which constitute solid water-soluble masses whose aqueous solutions have a pronounced cleansing, emulsifying and wetting-out action.

9. The sulphuric acid esters of normal monovalent unsaturated aliphatic alcohols containing at least 9 carbon atoms in a condition free from other sulfate and sulphonic acid groups, the sodium salts of which constitute solid water-soluble masses whose aqueous solutions have a pronounced cleansing, emulsifying and wetting-out action.

10. The sulphuric acid esters of normal monovalent unsaturated aliphatic alcohols containing from 17 to 22 carbon atoms in a condition free from other sulfate and sulphonic acid groups, the sodium salts of which constitute solid water-soluble masses whose aqueous solutions have a pronounced cleansing, emulsifying and wetting-out action.

11. The sulphuric acid ester of olein alcohol free from other sulfate and sulphonic acid groups, the sodium salt of which constitutes a wax-like water-soluble mass whose aqueous solution has a pronounced cleansing, emulsifying and wetting-out action.

12. A process of preparing chemical products especially useful as cleansing, softening and scouring agents which comprises treating an unsaturated long chain alcohol having at least 9 carbon atoms per molecule with an addition product of sulphur trioxide and an amine.

13. A process according to claim 12, in which the unsaturated long chain alcohol is oleyl alcohol.

HUGO SIEBENBÜRGER.